United States Patent
Sellers

(10) Patent No.: US 11,015,525 B2
(45) Date of Patent: May 25, 2021

(54) METHODS, COMPUTER PROGRAMS, NON TRANSITORY COMPUTER READABLE STORAGE MEDIUMS, SIGNALS, AND APPARATUS FOR CONTROLLING ELECTRICAL POWER SUPPLIED TO A COMPONENT OF A VEHICLE

(71) Applicant: ROLLS-ROYCE plc, London (GB)

(72) Inventor: Benjamin J. Sellers, Bath (GB)

(73) Assignee: Rolls-Royce PLC, London (GB)

( * ) Notice: Subject to any disclaimer, the term of this patent is extended or adjusted under 35 U.S.C. 154(b) by 85 days.

(21) Appl. No.: 16/211,360

(22) Filed: Dec. 6, 2018

(65) Prior Publication Data
US 2019/0186360 A1 Jun. 20, 2019

(30) Foreign Application Priority Data
Dec. 20, 2017 (GB) ..................................... 1721389

(51) Int. Cl.
*F02C 7/057* (2006.01)
*F02C 7/32* (2006.01)
(Continued)

(52) U.S. Cl.
CPC .............. *F02C 7/057* (2013.01); *B64D 27/10* (2013.01); *B64D 31/00* (2013.01); *B64F 5/60* (2017.01); *F01D 15/10* (2013.01); *F01D 25/02* (2013.01); *F02C 7/047* (2013.01); *F02C 7/32* (2013.01); *F02C 9/00* (2013.01); *B64D 15/12* (2013.01); *B64D 2221/00* (2013.01);
(Continued)

(58) Field of Classification Search
CPC . F02C 7/057; F02C 9/28; F02C 7/047; B64D 27/10; B64D 15/12; B64D 31/00; B64D 2221/00; B64F 5/60; F01D 25/02
USPC ........................................................ 701/100
See application file for complete search history.

(56) References Cited

U.S. PATENT DOCUMENTS 6,487,847 B1 * 12/2002 Snow ....................... F02C 7/236
60/235
2006/0047406 A1 * 3/2006 Chatfield ............ F02D 41/2416
701/104
(Continued)

FOREIGN PATENT DOCUMENTS

EP 0638770 2/1995
EP 2657457 A2 10/2013
(Continued)

OTHER PUBLICATIONS

Great Britain Search Report dated Jun. 18, 2018, issued in GB Patent Application No. 1721389.3.
(Continued)

*Primary Examiner* — Isaac G Smith
(74) *Attorney, Agent, or Firm* — Shumaker & Sieffert, P.A.

(57) ABSTRACT

A method of controlling electrical power supplied to a component of a vehicle, the method comprising: receiving a signal comprising information associated with an operating condition of a gas turbine engine; determining whether a parameter exceeds a predetermined threshold value using the information in the received signal; and controlling a reduction in electrical power supplied to a component of a vehicle from a generator of the gas turbine engine if the parameter exceeds the predetermined threshold value.

9 Claims, 4 Drawing Sheets

(51) Int. Cl.
  *F01D 15/10* (2006.01)
  *F02C 9/00* (2006.01)
  *B64F 5/60* (2017.01)
  *B64D 27/10* (2006.01)
  *B64D 31/00* (2006.01)
  *F01D 25/02* (2006.01)
  *F02C 7/047* (2006.01)
  *B64D 15/12* (2006.01)

(52) U.S. Cl.
  CPC .... *F05D 2220/76* (2013.01); *F05D 2270/101* (2013.01); *F05D 2270/309* (2013.01); *F05D 2270/335* (2013.01)

(56) References Cited

U.S. PATENT DOCUMENTS

| | | | |
|---|---|---|---|
| 2009/0151425 A1 | 6/2009 | Miwa | |
| 2010/0196137 A1* | 8/2010 | Horn | F02C 9/18 415/1 |
| 2011/0277443 A1* | 11/2011 | Pereira | B64D 15/00 60/39.093 |
| 2013/0284608 A1 | 10/2013 | Blake et al. | |
| 2015/0159552 A1* | 6/2015 | Rodriguez | F02C 7/12 290/2 |
| 2016/0265400 A1* | 9/2016 | Krug | F16C 33/6637 |

FOREIGN PATENT DOCUMENTS

| | | |
|---|---|---|
| EP | 2881563 | 6/2015 |
| EP | 2942679 A2 | 11/2015 |
| EP | 3130783 A1 | 2/2017 |
| JP | 2013032707 | 2/2013 |

OTHER PUBLICATIONS

Extended European Search Report from counterpart EP Application No. 18207297.5 dated May 7, 2019, 10 pgs.

Response to Extended European Search Report from counterpart EP Application No. 18207297.5 dated May 7, 2019, filed Dec. 18, 2019, 43 pgs.

* cited by examiner

METHODS, COMPUTER PROGRAMS, NON TRANSITORY COMPUTER READABLE STORAGE MEDIUMS, SIGNALS, AND APPARATUS FOR CONTROLLING ELECTRICAL POWER SUPPLIED TO A COMPONENT OF A VEHICLE

CROSS-REFERENCE TO RELATED APPLICATIONS

This application is based upon and claims the benefit of priority from UK Patent Application Number 1721389.3 filed on 20 Dec. 2017, the entire contents of which are incorporated herein by reference.

BACKGROUND

Technical Field

The present disclosure concerns methods, computer programs, non-transitory computer readable storage mediums, signals, and apparatus for controlling electrical power supplied to a component of a vehicle.

Description of the Related Art

Gas turbine engines usually comprise an electrical generator that converts mechanical power to electrical power. The generated electrical power may be supplied to components of the gas turbine engine (such as the fuel pump and the oil pump) to enable them to operate. Additionally, electrical power may be supplied to various components of a vehicle on which the gas turbine engine is mounted. For example, in an airliner, electrical power may be supplied to aircraft systems (such as cabin lighting) by the electrical generator of a gas turbine engine.

SUMMARY

According to a first aspect there is provided a method of controlling electrical power supplied to a component of a vehicle, the method comprising: receiving a signal comprising information associated with an operating condition of a gas turbine engine; determining whether a parameter exceeds a predetermined threshold value using the information in the received signal; and controlling a reduction in electrical power supplied to a component of a vehicle from a generator of the gas turbine engine if the parameter exceeds the predetermined threshold value.

The parameter may be a rate of change of throttle.

The parameter may be a rate of change in rotational speed of a rotor of the gas turbine engine.

The parameter may be a rate of change in fuel flow.

The component of the vehicle may be a component of the gas turbine engine.

The component of the vehicle may comprise a heater of a nacelle.

The component of the vehicle may comprise an energy storage device.

Controlling reduction in electrical power supplied to the component may reduce the supply of electrical power to zero Watts.

Controlling reduction in electrical power supplied to the component may reduce the supply of electrical power from a first electrical power level to a second electrical power level. The second electrical power level may be greater than zero Watts.

Subsequent to a reduction in electrical power supplied to the component, the method may further comprise: determining whether a parameter exceeds a predetermined threshold value; and controlling an increase in electrical power to the component of the vehicle if the parameter does not exceed the predetermined threshold value.

The method may be performed during a transient manoeuvre of the gas turbine engine.

According to a second aspect there is provided a computer program that, when read by a computer, causes performance of the method as described in the preceding paragraphs.

According to a third aspect there is provided a non-transitory computer readable storage medium comprising computer readable instructions that, when read by a computer, cause performance of the method as described in the preceding paragraphs.

According to a fourth aspect there is provided a signal comprising computer readable instructions that, when read by a computer, cause performance of the method as described in the preceding paragraphs.

According to a fifth aspect there is provided apparatus for controlling electrical power supplied to a component of a vehicle, the apparatus comprising a controller configured to: receive a signal comprising information associated with an operating condition of a gas turbine engine; determine whether a parameter exceeds a predetermined threshold value using the information in the received signal; and control a reduction in electrical power supplied to a component of a vehicle from a generator of the gas turbine engine if the parameter exceeds the predetermined threshold value.

The parameter may be a rate of change of throttle.

The parameter may be a rate of change in rotational speed of a rotor of the gas turbine engine.

The parameter may be a rate of change in fuel flow.

The component of the vehicle may be a component of the gas turbine engine.

The component of the vehicle may comprise a heater of a nacelle.

The component of the vehicle may comprise an energy storage device.

The controller may be configured to control reduction in electrical power supplied to the component to zero Watts.

Controlling reduction in electrical power supplied to the component may reduce the supply of electrical power from a first electrical power level to a second electrical power level. The second electrical power level may be greater than zero Watts.

The controller may be configured to: determine whether a parameter exceeds a predetermined threshold value subsequent to a reduction in electrical power supplied to the component; and control an increase in electrical power to the component of the vehicle if the parameter does not exceed the predetermined threshold value.

The controller may be configured to control the reduction in electrical power supplied to the component during a transient manoeuvre of the gas turbine engine.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 1:
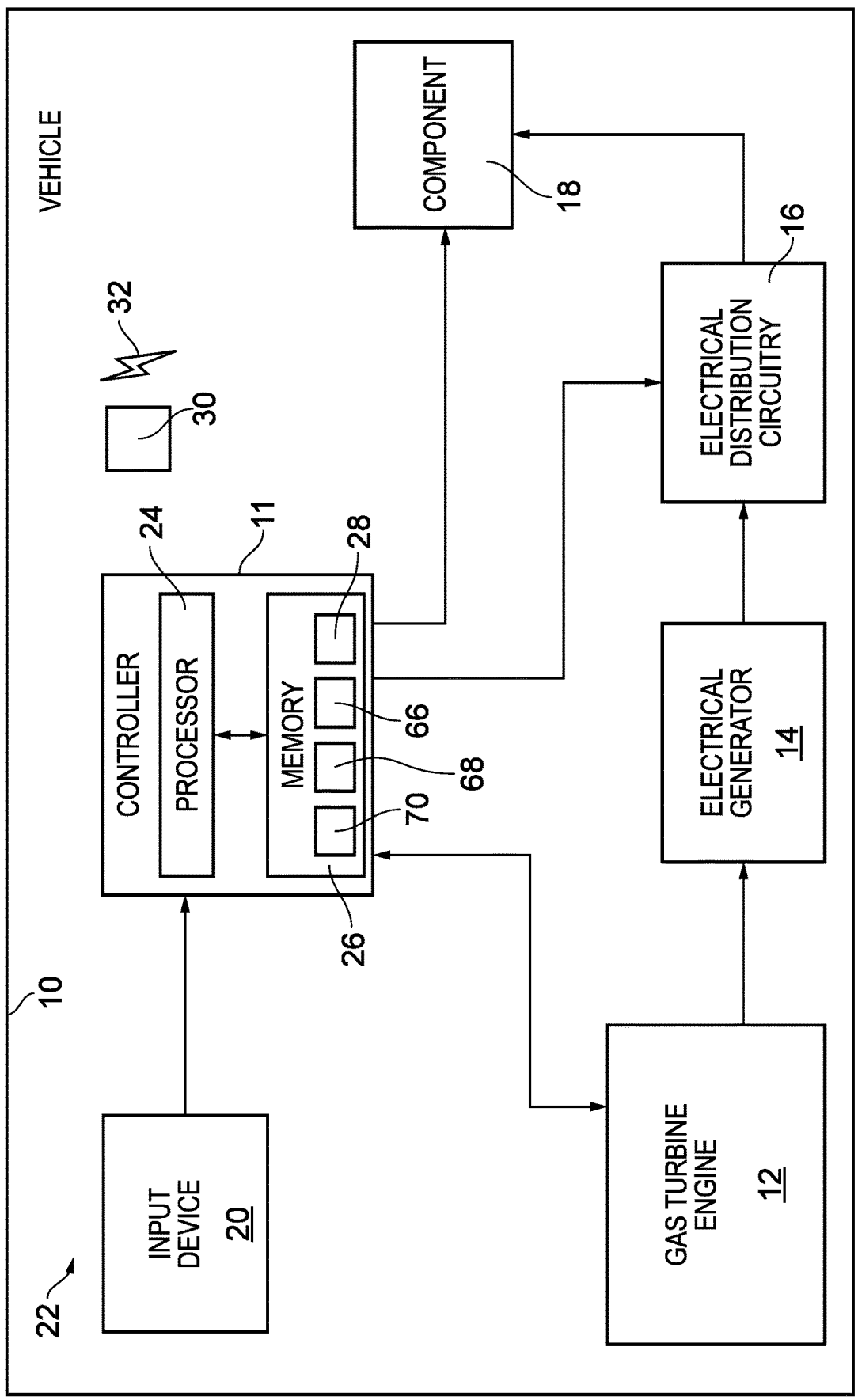
FIG. 1 illustrates a schematic diagram of apparatus for controlling electrical power supplied to a component of a vehicle according to various examples.

FIG. 1 illustrates a schematic diagram of a vehicle 10 including a controller 11, a gas turbine engine 12, an electrical generator 14, electrical distribution circuitry 16, a component 18, and an input device 20. The vehicle 10 may be any mobile machine such as an aircraft (an airliner for example) or a watercraft (a naval vessel such as an aircraft carrier or a destroyer for example).

The input device 20, the controller 11, and the electrical distribution circuitry 16 may form an apparatus 22 for controlling supply of electrical power to the component 18 of the vehicle 12. In summary, the apparatus 22 is configured to determine whether the gas turbine engine 12 has a risk of compressor surge; and where there is a risk of compressor surge, to reduce the electrical power load on the gas turbine engine.

In some examples, the apparatus 22 may be a module. As used herein, the wording 'module' refers to a device or apparatus where one or more features are included at a later time and, possibly, by another manufacturer or by an end user. For example, where the apparatus 22 is a module, the apparatus 22 may only include the controller 11, and the remaining features (such as the input device 20 and the electrical distribution circuitry 16) may be added by another manufacturer, or by an end user.

The controller 11, the input device 20, and the electrical distribution circuitry 16 may be coupled to one another via a wireless link and may consequently comprise transceiver circuitry and one or more antennas. Additionally or alternatively, the controller 11, the input device 20 and the electrical distribution circuitry 16 may be coupled to one another via a wired link and may consequently comprise interface circuitry (such as a Universal Serial Bus (USB) socket). It should be appreciated that the controller 11, the input device 20, and the electrical distribution circuitry 16 may be coupled to one another via any combination of wired and wireless links.

Figure 3:
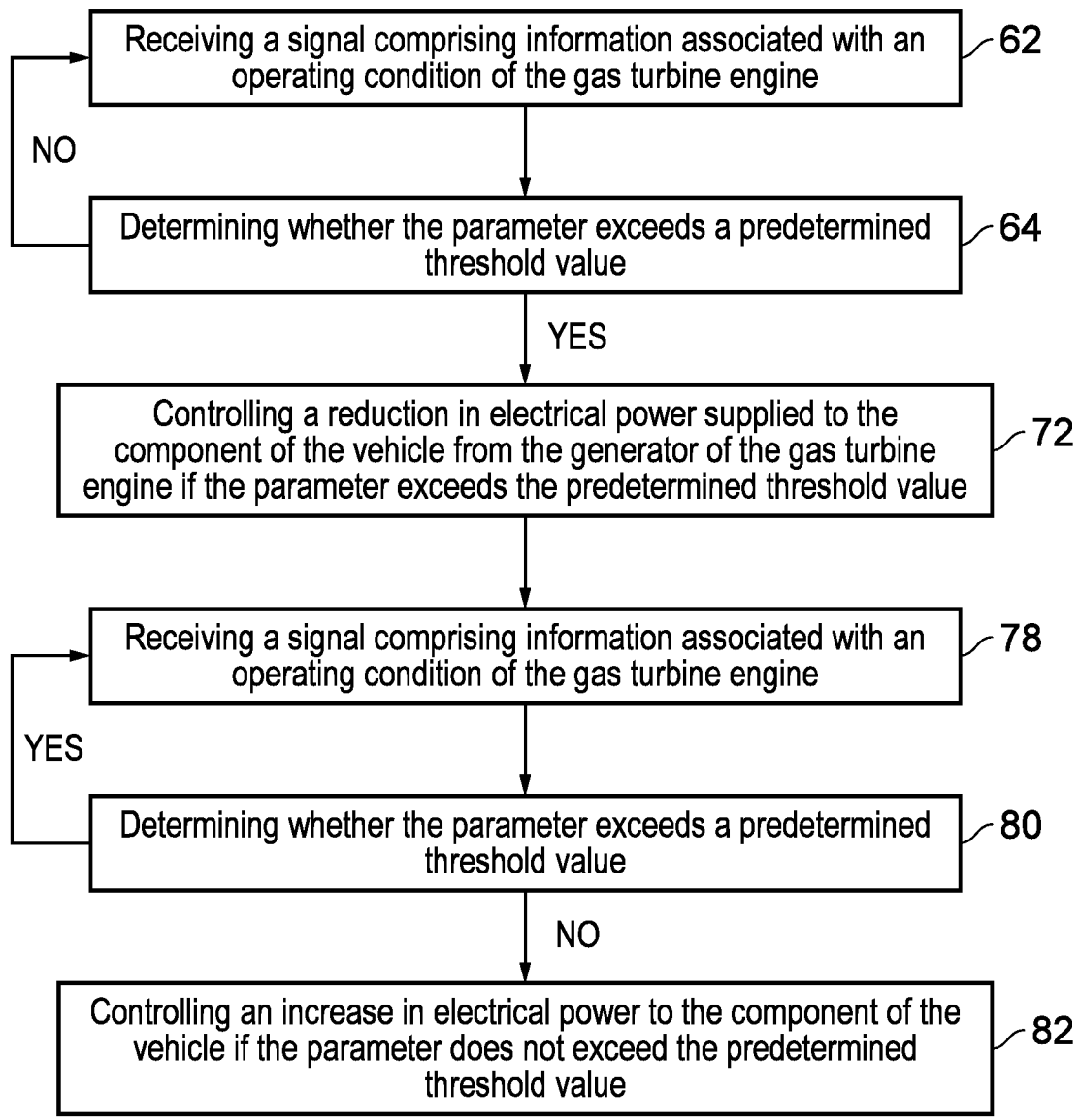
FIG. 3 illustrates a flow diagram of a method of controlling electrical power supplied to a component of a vehicle according to various examples.

The controller 11 may comprise any suitable circuitry to cause performance of the methods described herein and as illustrated in FIG. 3. The controller 11 may comprise: control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU), to perform the methods.

The controller 11 may be mounted on the vehicle 10, or may be mounted on the gas turbine engine 12, or may be mounted at a location external to the vehicle 10 and the gas turbine engine 12 (a remote building for example). In some examples, the controller 11 may be distributed between two or more of: the vehicle 10; the gas turbine engine 12; and a location external to the vehicle 10 and the gas turbine engine 12.

In various examples, the controller 11 may comprise at least one processor 24 and at least one memory 26. The memory 26 stores a computer program 28 comprising computer readable instructions that, when read by the processor 24, causes performance of the methods described herein, and as illustrated in FIG. 3. The computer program 28 may be software or firmware, or may be a combination of software and firmware.

The processor 24 may be mounted on the vehicle 10, or may be mounted on the gas turbine engine 12, or may be mounted at a location external to the vehicle 10 and the gas turbine engine 12. In some examples, the processor 24 may be distributed between two or more of: the vehicle 10; the gas turbine engine 12; and a location external to the vehicle 10 and the gas turbine engine 12. The processor 24 may include at least one microprocessor and may comprise a single core processor, may comprise multiple processor cores (such as a dual core processor or a quad core processor), or may comprise a plurality of processors (at least one of which may comprise multiple processor cores).

The memory 26 may be mounted on the vehicle 10, or may be mounted on the gas turbine engine 12, or may be mounted at a location external to the vehicle 10 and the gas turbine engine 12. In some examples, the memory 26 may be distributed between two or more of: the vehicle 10; the gas turbine engine 12; and a location external to the vehicle 10 and the gas turbine engine 12. The memory 26 may be any suitable non-transitory computer readable storage medium, data storage device or devices, and may comprise a hard disk and/or solid state memory (such as flash memory). The memory 26 may be permanent non-removable memory, or may be removable memory (such as a universal serial bus (USB) flash drive or a secure digital card). The memory 26 may include: local memory employed during actual execution of the computer program; bulk storage; and cache memories which provide temporary storage of at least some computer readable or computer usable program code to reduce the number of times code may be retrieved from bulk storage during execution of the code.

The computer program 28 may be stored on a non-transitory computer readable storage medium 30. The computer program 28 may be transferred from the non-transitory computer readable storage medium 30 to the memory 26. The non-transitory computer readable storage medium 30 may be, for example, a USB flash drive, a secure digital (SD) card, an optical disc (such as a compact disc (CD), a digital versatile disc (DVD) or a Blu-ray disc). In some examples, the computer program 28 may be transferred to the memory 26 via a signal 32 (such as a wireless signal or via a wired signal).

Input/output devices may be coupled to the apparatus 22 either directly or through intervening input/output controllers. Various communication adaptors may also be coupled to the controller 11 to enable the apparatus 22 to become coupled to other apparatus or remote printers or storage devices through intervening private or public networks. Non-limiting examples include modems and network adaptors of such communication adaptors.

Figure 2:
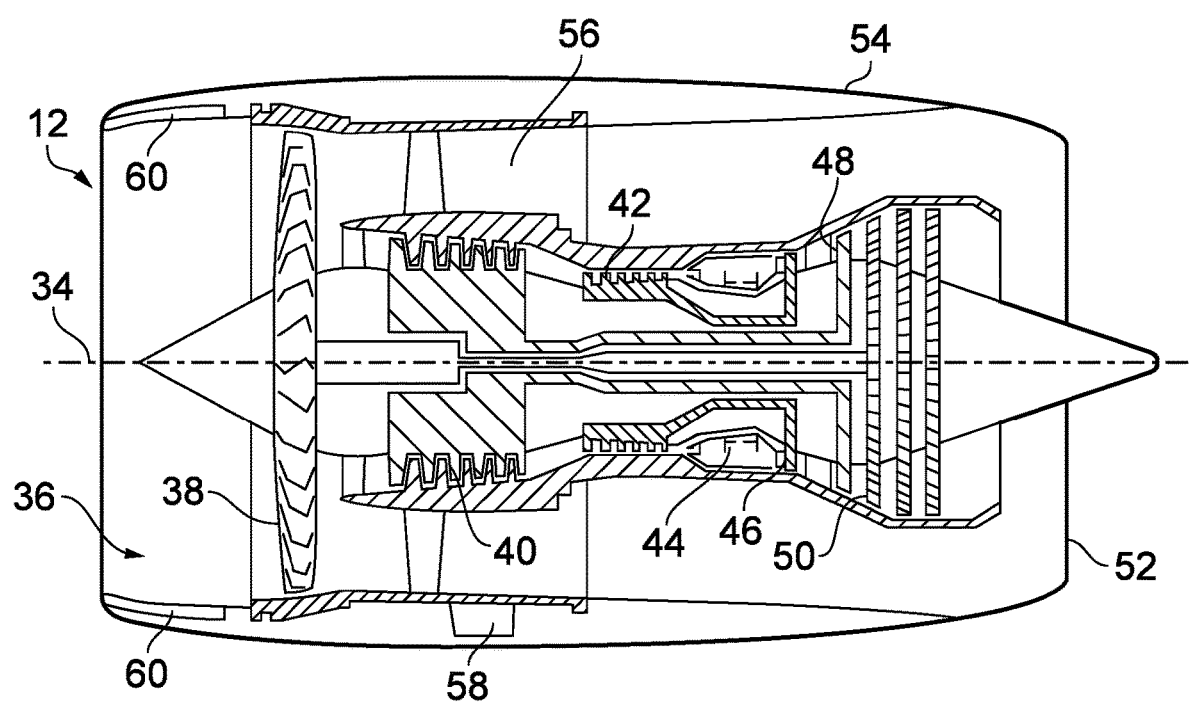
FIG. 2 illustrates a cross sectional side view of a gas turbine engine according to various examples.

The gas turbine engine 12 may be any gas turbine engine and may be, for example, a turbofan engine, a turboprop engine or a turboshaft engine. Furthermore, the gas turbine engine 12 may have any suitable internal structure. For example, FIG. 2 illustrates a cross sectional side view of a gas turbine engine 12 having a principal and rotational axis 34 and comprising, in axial flow series, an air intake 36, a propulsive fan 38, an intermediate pressure compressor 40, a high-pressure compressor 42, combustion equipment 44, a high-pressure turbine 46, and intermediate pressure turbine 48, a low-pressure turbine 50, an exhaust nozzle 52 and a nacelle 54 that defines both the intake 36 and the exhaust nozzle 52.

The gas turbine engine 12 works so that air entering the intake 36 is accelerated by the fan 38 to produce two air flows: a first air flow into the intermediate pressure compressor 40 and a second air flow which passes through a bypass duct 56 to provide propulsive thrust. The intermediate pressure compressor 40 compresses the air flow directed into it before delivering that air to the high pressure compressor 42 where further compression takes place.

The compressed air exhausted from the high-pressure compressor 42 is directed into the combustion equipment 44 where it is mixed with fuel and the mixture combusted. The resultant hot combustion products then expand through, and thereby drive the high, intermediate and low-pressure turbines 46, 48, 50 before being exhausted through the nozzle 52 to provide additional propulsive thrust. The high pressure turbine 46, the intermediate pressure turbine 48 and the low pressure turbine 50 drive respectively the high pressure compressor 42, intermediate pressure compressor 40 and the fan 38, each by a suitable interconnecting shaft.

The gas turbine engine 12 also comprises an accessory gearbox 58 that is driven by one of the interconnecting shafts (for example, the shaft interconnecting the high pressure compressor 42 and the high pressure turbine 46). The shafts that connect the gearbox 58 to one of the interconnecting shafts are not illustrated in FIG. 2 to maintain the clarity of the figure. The accessory gearbox 58 is mounted on a fan case and positioned within the nacelle 54. In other examples, the accessory gearbox 58 may be mounted on a core engine case (such as the inlet case or the intermediate case).

Other gas turbine engines to which the present disclosure may be applied may have alternative configurations. By way of an example, such gas turbine engines may have an alternative number of interconnecting shafts (two for example) and/or an alternative number of compressors and/or turbines. Furthermore, the gas turbine engine 12 may not comprise a gearbox provided in the drive train from a turbine to a compressor and/or fan. Additionally, where the gas turbine engine 12 is a turboshaft, the shaft connected to the low pressure turbine 50 does not drive the fan 38, but instead provides, or drives, an output shaft.

The electrical generator 14 is driven by the gas turbine engine 12 and is arranged to convert mechanical power from the gas turbine engine 12 into electrical power. For example, the electrical generator 14 may be driven by the accessory gearbox 58 of the gas turbine engine 12 illustrated in FIG. 2. In another example, the electrical generator 14 may be driven by the output shaft of a turbofan engine. In a further example, the electrical generator 14 may be embedded within the gas turbine engine 12 such that one of the interconnecting shafts provides, or is connected to, the rotor of the electrical generator 14.

The electrical distribution circuitry 16 is configured to receive the electrical power output from the electrical generator 14 and to distribute the electrical power to one or more components of the vehicle 10. For example, the electrical distribution circuitry 16 is configured to distribute electrical power to the component 18 of the vehicle 10. The electrical distribution circuitry 16 may comprise any suitable circuitry for distributing electrical power. For example, the electrical distribution circuitry 16 may comprise switches, transistors, and transformers. The controller 11 is configured to control the operation of the electrical distribution circuitry 16. For example, the controller 11 may control the electrical distribution circuitry 16 to change the electrical power distributed to the component 18 to a power between zero Watts and a maximum electrical power for that component 18.

The component 18 may be any component (or assembly of components) of the vehicle 10 that is configured to receive electrical power from the electrical generator 14 via the electrical distribution circuitry 16. The component 18 may be a component of the gas turbine engine 12. For example, the component 18 may comprise an electric heater 60 mounted on the inlet of the nacelle 54 for preventing ice forming on the nacelle 54. The electric heater 60 may be a resistive heater comprising one or more resistors. By way of another example, the component 18 may comprise a heat exchanger of the gas turbine engine 12. In a further example, the component 18 may comprise one or more pumps of an oil system of the gas turbine engine 12. In another example, the component 18 may comprise an energy storage device of the gas turbine engine 12.

In some examples, the component 18 may comprise a refrigeration system of the vehicle 10 that is arranged to refrigerate or freeze food and drink for passenger consumption. By way of a further example, the component 18 may comprise an energy storage device of the vehicle 10 that is arranged to store power for distributed power for propulsion systems or avionic systems (for example, refrigerant for avionic systems).

The input device 20 may be any device that is arranged to provide a signal to the controller 11 that includes information associated with an operating condition of the gas turbine engine 12. For example, the input device 20 may comprise a throttle lever for the gas turbine engine 12 that is arranged to provide a signal to the controller 11 that defines an engine throttle request. In another example, the input device 20 may comprise a sensor that is configured to sense the rotational speed of the high pressure compressor 42 and to provide the sensed rotational speed to the controller 11. In a further example, the input device 20 may comprise a sensor that is configured to sense the rotational speed of the intermediate pressure compressor 40 and to provide the sensed rotational speed to the controller 11. In another example, the input device 20 may comprise a sensor that is configured to sense the flow of fuel supplied to the combustion equipment 44 and to provide the sensed fuel flow to the controller 11.

The operation of the apparatus 22 is described in the following paragraphs with reference to FIG. 3.

At block 62, the method includes receiving a signal comprising information associated with an operating condition of the gas turbine engine 12. For example, the controller 11 may receive a signal from a throttle lever 20 that includes engine throttle request data. In another example, the controller 11 may receive a signal from a rotational speed sensor 20 that includes sensed rotational speed data of the high pressure compressor 42 or the intermediate pressure compressor 40. In a further example, the controller 11 may receive a signal from a fuel flow sensor 20 that comprises fuel flow data.

At block 64, the method includes determining whether a parameter exceeds a predetermined threshold value using the information in the signal received at block 62. For example, the controller 11 may determine whether the requested rate of change of throttle exceeds a predetermined threshold value 66 stored in the memory 26. By way of another example, the controller 11 may determine whether a rate of change of rotational speed of the intermediate pressure compressor 40 or the high pressure compressor 42 exceeds a predetermined threshold value 68 stored in the memory 26. By way of a further example, the controller 11 may determine whether a rate of change in fuel flow exceeds a threshold value 70 stored in the memory 26. Where the parameter exceeds the predetermined threshold value, this is indicative of risk of compressor surge in the gas turbine engine 12.

In some examples, the parameter may not be a rate of change, but may be a magnitude. For example, the parameter may be P30/P20, where P20 is the pressure of the air at the inlet to the compressor and P30 is the pressure of the air delivered by the compressor. A threshold magnitude of P30/P20 can be characterised with respect to shaft speed of the compressor.

Where the controller 11 determines that the parameter does not exceed the predetermined threshold value 66, 68, 70 stored in the memory 26 (that is, the controller 11 determines there is low risk or no risk of compressor surge), the method returns to block 62.

Where the controller 11 determines that the parameter exceeds the predetermined threshold value 66, 68, 70 stored in the memory 26 (that is, the controller 11 determines there is a risk of compressor surge), the method moves to block 72.

Figure 4:
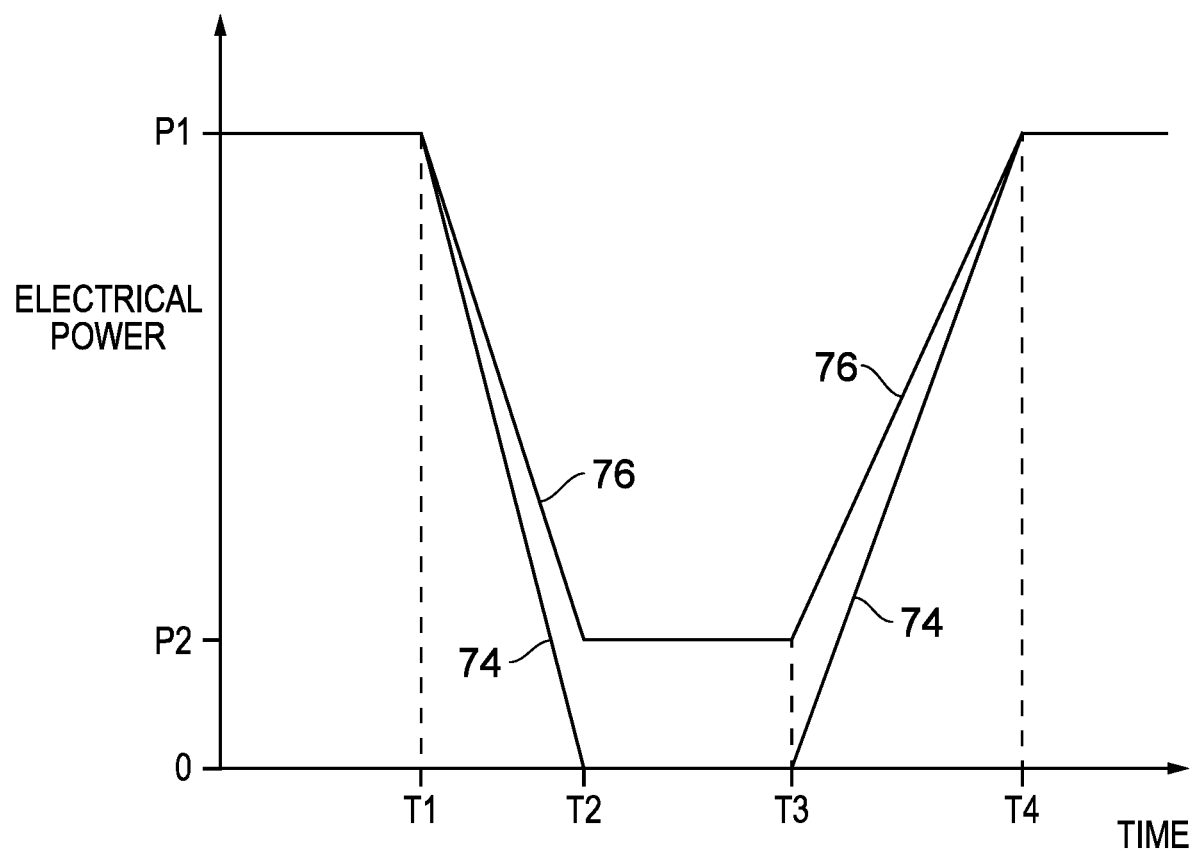
FIG. 4 illustrates a graph of electrical power supplied to a component of a vehicle versus time according to various examples.

At block 72, the method includes controlling a reduction in electrical power supplied to the component 18 of the vehicle 10 from the generator 14 of the gas turbine engine 12. For example (and with reference to FIG. 4), at time T1 the controller 11 may control the electrical distribution circuitry 16 to reduce the electrical power supplied to the component 18 (such as the heater 60 of the nacelle 54). In some examples, the electrical power supplied to the component 18 may be reduced from P1 Watts to zero Watts (as illustrated by line 74 in FIG. 4). In other examples, the electrical power supplied to the component 18 may be reduced from P1 Watts to P2 Watts (as illustrated by line 76 in FIG. 4).

At block 78, the method includes receiving a signal comprising information associated with an operating condition of the gas turbine engine 12. For example, the controller 11 may receive a signal from the throttle lever 20 that includes engine throttle request data, or may receive a signal from a rotational speed sensor 20 that includes sensed rotational speed data of the high pressure compressor 42 or the intermediate pressure compressor 40, or may receive a signal from a fuel flow sensor 20 that comprises fuel flow data.

At block 80, the method includes determining whether a parameter exceeds a predetermined threshold value using the information in the signal received at block 78. The parameter at block 80 may be the same as the parameter at block 64, or may be different to the parameter at block 64. For example, the controller 11 may determine whether the requested rate of change of throttle exceeds a predetermined threshold value 66 stored in the memory 26, may determine whether a rate of change of rotational speed of the intermediate pressure compressor 40 or the high pressure compressor 42 exceeds a predetermined threshold value 68 stored in the memory 26, or may determine whether a rate of change in fuel flow exceeds a threshold value 70 stored in the memory 26.

Where the controller 11 determines that the parameter exceeds the predetermined threshold value 66, 68, 70 stored in the memory 26 (that is, the controller 11 determines there is a risk of compressor surge), the method moves to block 78 and the electrical power supplied to the component 18 is maintained at a low level or at zero Watts.

Where the controller 11 determines that the parameter does not exceed the predetermined threshold value 66, 68, 70 stored in the memory 26 (that is, the controller 11 determines there is low risk or no risk of compressor surge), the method moves to block 82.

At block 82, the method includes controlling an increase in electrical power supplied to the component 18 of the vehicle 10. For example (and with reference to FIG. 4), at time T3 the controller 11 may control the electrical distribution circuitry 16 to increase the electrical power supplied to the component 18 (such as the heater 60 of the nacelle 54). In some examples, the electrical power supplied to the component 18 may be increased from zero Watts to P1 Watts (as illustrated by line 74 in FIG. 4). In other examples, the electrical power supplied to the component 18 may be increased from P2 Watts to P1 Watts (as illustrated by line 76 in FIG. 4).

It should be appreciated that where the component 18 comprises the heater 60 of the nacelle 54, the time between T1 and T4 may be relatively short (less than a second for example) and the latent heat in the nacelle 54 may prevent the formation of ice on the nacelle 54 between times T1 and T4.

The apparatus 22 and the methods described in the preceding paragraphs may provide several advantages.

First, the apparatus 22 and the method may reduce the risk of compressor surge in the gas turbine engine 12 during transient manoeuvres of the gas turbine engine 12. It should be appreciated that a transient manoeuvre is a desired and controlled manoeuvre of the gas turbine engine 12. A transient manoeuvre does not go beyond the limitations of the gas turbine engine 12 and therefore does not include abnormal manoeuvres such as a shaft break.

Second, the design of the gas turbine engine 12 may not have to take into account a high level of power off-take for adequate compressor surge margin and thus, compressor optimization may be focussed on efficiency, leading to a lower fuel burn gas turbine engine.

It will be understood that the invention is not limited to the embodiments above-described and various modifications and improvements can be made without departing from the concepts described herein. For example, the different embodiments may take the form of an entirely hardware embodiment, an entirely software embodiment, or an embodiment containing both hardware and software elements.

Except where mutually exclusive, any of the features may be employed separately or in combination with any other features and the disclosure extends to and includes all combinations and sub-combinations of one or more features described herein.

The invention claimed is:

1. A method of controlling electrical power supplied to a component of a vehicle, the method comprising:
receiving, by a controller, a signal comprising information associated with an operating condition of a gas turbine engine, wherein the signal comprises at least one of: a signal from a throttle lever that includes engine throttle request data, a signal from a rotational speed sensor that includes sensed rotational speed data of a high pressure compressor or an intermediate pressure compressor of the gas turbine engine, a signal from a fuel flow sensor that comprises fuel flow data, or a signal from a compressor pressure sensors that includes data for pressure of air at an inlet to the compressor and pressure of air delivered by the compressor;

determining, by the controller, whether a parameter exceeds a predetermined threshold value using the information in the received signal, wherein the parameter comprises at least one of a rate of change of throttle, a rate of change of rotational speed of the intermediate pressure compressor or the high pressure compressor, a rate of change in fuel flow, or P30/P20, wherein P20 is a pressure of the air at the inlet to the compressor and P30 is the pressure of the air delivered by the compressor;

in response to the parameter exceeding the predetermined threshold, determining, by the controller, that there is a risk of compressor surge; and in response to determining that there is the risk of compressor surge, controlling, by the controller, a reduction in electrical power supplied to a component of a vehicle from a generator of the gas turbine engine, wherein the component of the vehicle comprises an electric heater mounted on an inlet of a nacelle.

2. The method as claimed in claim 1, wherein controlling reduction in electrical power supplied to the component reduces the supply of electrical power to zero Watts.

3. The method as claimed in claim 1, wherein controlling reduction in electrical power supplied to the component reduces the supply of electrical power from a first electrical power level to a second electrical power level, the second electrical power level being greater than zero Watts.

4. The method as claimed in claim 1, wherein subsequent to a reduction in electrical power supplied to the component, the method further comprises:
determining whether a parameter exceeds a predetermined threshold value; and
controlling an increase in electrical power to the component of the vehicle if the parameter does not exceed the predetermined threshold value.

5. The method as claimed in claim 1, wherein the method is performed during a transient manoeuvre of the gas turbine engine.

6. A non-transitory computer readable storage medium comprising computer readable instructions that, when read by a computing device, cause the computing device to:
receive a signal comprising information associated with an operating condition of a gas turbine engine, wherein the signal comprises at least one of: a signal from a throttle lever that includes engine throttle request data, a signal from a rotational speed sensor that includes sensed rotational speed data of a high pressure compressor or an intermediate pressure compressor of the gas turbine engine, a signal from a fuel flow sensor that comprises fuel flow data, or a signal from a compressor pressure sensors that includes data for pressure of air at an inlet to the compressor and pressure of air delivered by the compressor;
determine whether a parameter exceeds a predetermined threshold value using the information in the received signal, wherein the parameter comprises at least one of a rate of change of throttle, a rate of change of rotational speed of the intermediate pressure compressor or the high pressure compressor, a rate of change in fuel flow, or P30/P20, wherein P20 is a pressure of the air at the inlet to the compressor and P30 is the pressure of the air delivered by the compressor;
in response to the parameter exceeding the predetermined threshold, determine, by the controller, that there is a risk of compressor surge; and
in response to determining that there is the risk of compressor surge, control a reduction in electrical power supplied to a component of a vehicle from a generator of the gas turbine engine, wherein the component of the vehicle comprises an electric heater mounted to an inlet of a nacelle.

7. An apparatus for controlling electrical power supplied to a component of a vehicle, the apparatus comprising a controller configured to:
receive a signal comprising information associated with an operating condition of a gas turbine engine, wherein the signal comprises at least one of: a signal from a throttle lever that includes engine throttle request data, a signal from a rotational speed sensor that includes sensed rotational speed data of a high pressure compressor or an intermediate pressure compressor of the gas turbine engine, a signal from a fuel flow sensor that comprises fuel flow data, or a signal from a compressor pressure sensors that includes data for pressure of air at an inlet to the compressor and pressure of air delivered by the compressor;
determine whether a parameter exceeds a predetermined threshold value using the information in the received signal, wherein the parameter comprises at least one of a rate of change of throttle, a rate of change of rotational speed of the intermediate pressure compressor or the high pressure compressor, a rate of change in fuel flow, or P30/P20, wherein P20 is a pressure of the air at the inlet to the compressor and P30 is the pressure of the air delivered by the compressor;
in response to the parameter exceeding the predetermined threshold, determine, by the controller, that there is a risk of compressor surge; and
in response to determining that there is the risk of compressor surge, control a reduction in electrical power supplied to a component of a vehicle from a generator of the gas turbine engine, wherein the component of the vehicle comprises an electric heater mounted to an inlet of a nacelle.

8. The apparatus as claimed in claim 7, wherein the controller is configured to:
determine whether a parameter exceeds a predetermined threshold value subsequent to a reduction in electrical power supplied to the component; and
control an increase in electrical power to the component of the vehicle if the parameter does not exceed the predetermined threshold value.

9. The apparatus as claimed in claim 7, wherein the controller is configured to control the reduction in electrical power supplied to the component during a transient manoeuvre of the gas turbine engine.

* * * * *